United States Patent [19]

Hunter et al.

[11] Patent Number: 5,672,194

[45] Date of Patent: *Sep. 30, 1997

[54] METHOD AND APPARATUS FOR EXTRACTING PRECIOUS METALS FROM THEIR ORES AND THE PRODUCT THEREOF

[75] Inventors: Robert M. Hunter; Frank M. Stewart; Tamara Darsow, all of Bozeman, Mont.

[73] Assignee: Yellowstone Environmental Science, Inc., Bozeman, Mont.

[*] Notice: The term of this patent shall not extend beyond the expiration date of Pat. No. 5,449,397.

[21] Appl. No.: 436,726

[22] Filed: May 8, 1995

Related U.S. Application Data

[63] Continuation-in-part of Ser. No. 265,322, Jun. 24, 1994, Pat. No. 5,449,397.

[51] Int. Cl.$^6$ ................................. C22B 3/02; C22B 3/18
[52] U.S. Cl. .................. 75/712; 75/744; 266/101; 423/DIG. 17
[58] Field of Search .................. 266/101; 75/712, 75/744; 423/DIG. 17

[56] References Cited

U.S. PATENT DOCUMENTS

| | | |
|---|---|---|
| 4,778,519 | 10/1988 | Pesic. |
| 4,822,413 | 4/1989 | Pooley. |
| 4,902,345 | 2/1990 | Ball et al.. |
| 4,974,816 | 12/1990 | Emmett, Jr. et al. ............... 266/101 |
| 4,987,081 | 1/1991 | Hackl et al.. |
| 5,076,927 | 12/1991 | Hunter. |
| 5,127,942 | 7/1992 | Brierley et al.. |
| 5,246,486 | 9/1993 | Brierley et al.. |

OTHER PUBLICATIONS

Alper, J. (1984). Bacterial methods may strike it rich in refining metals, cleaning coal. *High Technology*, April, 32–35.

Anderson, G.M. (1962). The solubility of PbS in H2S–water solutions. *Economic Geology*, 57, 809–828.

Barnes, H.L. (1967). *Geochemistry of Hydrothermal ore deposits*. New York, NY: Holt, Rinehart and Winston, Inc.

Brierley, C.L., & Brierley, J.A. (1973.). A chemoautotrophic and thermophilic microorganism isolated from an acid hot spring. *Canadian J. Microbiology*, 19, 183–188.

Budden, J.R. & Spencer, P.A. (1993). Tolerance to temperature and water quality for bacterial oxidation: The benefits of Bac Tech's moderately thermophilic culture. *FEMS Microbiology Reviews*, 11, 191–196.

Chapman, J.T., Marchant, P.B., Lawrence, R.W., & Knopp R. (1993). Bio–oxidation of a refractory gold bearing high arsenic sulphide concentrate: A pilot study. *FEMS Microbiology Reviews*, 11, 243–252.

De Rosa, M., Gambacorta, A., & Bullock, J.D. (1975). Extremely thermophilic acidophilic bacteria convergent with *Sulfolobus acidocaldarius*. *J. General Microbiology*, 86, 156–164.

(List continued on next page.)

*Primary Examiner*—Melvyn Andrews

[57] ABSTRACT

A method and apparatus for extraction of precious metals from their ores and the product thereof. Oxidized ore comprising a precious metal is exposed to a leaching solution (lixiviant) comprising a relatively high concentration (fugacity) of dissolved hydrogen sulfide gas, a relatively high concentration (activity) of bisulfide ions, and a relatively low concentration (fugacity) of dissolved hydrogen gas. The hydrogen sulfide gas and bisulfide ions are preferably added to the solution by sulfate-reducing bacteria growing in a medium comprising dissolved sulfate ions and dissolved nitrate ions, but abiotic sources may also be used. Examples of such bacteria include mesophilic, fresh-water species such as *Desulfobacterium catecholicum* DSM 3882 and *Desulfovibrio simplex* DSM 4141; mesophilic, salt-water species such as *Desulfovibrio salexigens* DSM 2638; and thermophilic, fresh-water species such as *Desulfomaculum kuznetsovii* VKM B-1805. The complexed precious metal is recovered from the lixiviant.

14 Claims, 3 Drawing Sheets

OTHER PUBLICATIONS

Duarte, J.C., Estrada, P.C., Pereira, P.C., & Beaumont, H.P. (1993). *FEMS Microbiology Reviews*, 11, 97–102.

Ehrlich, H.L. and Brierley C.L. (1990). *Microbial Mineral Recovery*. New York: McGraw–Hill.

Gammons, C.H. & Barnes, H.L. (1989). The solubility of Ag2S in near–neutral aqueous sulfide solutions at 25 to 300 C. *Geochimica et Cosmochimica Acta*, 53, 279–290.

Gammons, C.H., Bloom, M.S., & Yu, Y. (1992). Experimental investigation of the hydrothermal geochemistry of platinum and palladium: I. Solubility of platinum and palladium sulfide minerals in NaCl/H2SO4 solutions at 300 C. *Geochimca et Cosmochimica Acta*, 56, 3881–3894.

Guilbert, J.M. & Park, C.F., Jr. (1986). *The geology of ore deposits*. New York: W.H. Freeman and Company.

Hackl, R.P., Wright F., & Bruynesteyn, A. (1986). A new biotech process for refractory gold–silver concentrates. *Proceedings of the Third Annual General Meeting of Biominet*, Aug. 20–21, 71–90.

Hancock, R.D., Finkelstein, N.P., & Evers, A. (1977). A linear free–energy relation involving the formation constants of palladium(II) and platinum(II). *J. inorg. nucl. Chem*, 39, 1031–1034.

Hansford, G.S., & Miller, D.M. (1993). Biooxidation of a gold–bearing pyrite–arsenophyrite concentrate. *FEMS Microbiology Reviews*, 11, 175–182.

Harper, S.R. & Pohland, F.G. (1986). Recent developments in hydrogen management during anaerobic biological wastewater treatment. *Biotechnology and Bioengineering*, 28, 585–602.

Hoffman, W., Katsikaros, N., & Davis, G. (1993). Design of a reactor bioleach process for refractory gold treatment. *FEMS Microbiology Reviews*, 11, 221–230.

Hunter, R.M. (1989). *Biocatalyzed Partial Demineralization of Acidic Metal–Sulfate Solutions*. Ph.D. Thesis, Montana State University.

Krauskopf, K.B. (1951). The solubility of gold. *Economic Geology*, 46, 858–870.

Linder, J.L. & Gruner, J.W. (1939). Action of alkali sulphide solutions on minerals at elevated temperatures. *Economic Geology*, 34, 537–560.

Liu, X., Petersson, S., & Sandstrom, A. (1993). Evaluation of process variables in bench–scale bio–oxidation of the Olympias concentrate. *FEMS Microbiology Reviews*, 11, 207–214.

Livesay–Goldblatt, E. (1985). *Fundamental and Applied Biohydrometallurgy*, Proc. 6th International Symposium on Biohydrometallurgy, Vancouver, B.C., 89–96.

Lyalikova, N.N. & Mokeicheva, L.Y. (1969). The role of bacteria in gold migration in deposits. *Microbiology*, 38, 805–810.

Marchant, P.B., & Lawrence, R.W. (1986). Flowsheet design, process control, and operating strategies in the biooxidation of refractory gold ores. *Proceedings of the Third Annual General Meeting of Biominet*, Aug. 20–21, 39–51.

Maturana, H., Lagos, U., Flores, V., Gaeta, M., Cornejo, L., & Wiertz, J.V. (1993). Integrated biological process for the treatment of a Chilean complex gold ore. *FEMS Microbiology Reviews*, 11, 215–220.

Melent'yev, B.N., Ivanenko, V.V., and Pamfilova, L.A. (1970). Solubility of some ore–forming sulfides under hydrothermal conditions. *Rastvorimost'nekotorykh rudoobrazuyushkikh sul'fidov v gidrotermal'nykh usloviyakh' Moskva*, 27–102.

Moffat, A.S. (1994). Microbial mining boosts the environment, bottom line. *Science*, 264, 778–779.

Mossman, D.J. & Dyer, B.D. (1985). The geochemistry of Witwatersrand–type gold deposits and the possible influence of ancient prokaryotic communities on gold dissolution and precipitation. *Precambrian Research*, 30, 303–319.

Mountain, B.W. & Wood, S.A. (1988). Chemical controls on the solubility, transport, and deposition of platinum and palladium in hydrothermal solutions: A thermodynamic approach. *Economic Geology*, 83, 492–510.

Murr., L. E. & Brierley, J.A. (1978). The use of large–scale test facilities in studies of the role of microorganisms in commercial leaching operations. In *Metallurgical Applications of Bacterial Leaching & Related Microbiological Phenomena*, Murr, L.E., Torma, A.E., & Brierley, J.A. (Eds.). New York: Academic Press.

Myers, B. (1981). *Genesis of uranium–gold pyritic conglomerates*. Washington, D.C: U.S. Government Printing Office.

Norris, P.R., & Owen, J.P. (1993). Mineral sulphide oxidation by enrichment cultures of novel thermoacidophilic bacteria. *FEMS Microbiology Reviews*, 11, 51–56.

Ogryzlo, S.P. (1935). Hydrothermal experiments with gold. *Economic Geology*, 30, 400–424.

Olson, G.J. (1994). Microbial oxidation of gold ores and gold bioleaching. *FEMS Microbiology Letters*, 119, 1–6.

Pantelis, G., & Ritchie, A.I.M. (1993). Rate controls on the oxidation of heaps of pyritic material imposed by upper temperature limits on the bacterially catalysed process. *FEMS Microbiology Reviews*, 11, 183–190.

Raymahashay, B.C. & Holland, H.D. (1969). Redox reactions accompanying hydrothermal wall rock alteration. *Economic Geology*, 64, 291–305.

Schwarzenbach, von G. & Widmer, M. (1966). Die loslichkeit von Metallsulfiden. *Helvetica Chimica Acta*, 49, 111–123.

Seward, T.M. (1976). The stability of chloride complexes of silver in hydrothermal solutions up to 350° C. *Geochimica et Cosmochimica Acta*, 40, 1329–1341.

Seward, T.M. (1973). Thio complexes of gold and the transport of gold in hydrothermal ore solutions. *Geochimica et Cosmochimica Acta*, 37, 379–399.

Shenberger, D.M. & Barnes, H.L. (1989). Solubility of gold in aqueous sulfide solutions from 150 to 350 C. *Geochimica et Cosmochimica Acta*, 53, 269–278.

Tomizuka, N., & Yagisawa, M. (1978). Optimum conditions for leaching of uranium and oxidation of lead sulfide with thiobacillus ferrooxidans and recovery of metals from bacterial leaching solution with sulfated-reducing bacteria. In *Metallurgical Applications of Bacterial Leaching and Related Microbiological Phenomena*, Murr, L.E., Torma, A.E., & Brierley, J.A. (Eds.). New York: Academic Press, 1978.

Torma, A.E. (1988). *Biotechnology: A Comprehensive Treatise in 8 Volumes*. Deerfield Beach, Fl: Verlag Chemie.

U.S. Bureau of Mines, Office of Technology Transfer. (1995). *u.S. Bureau of Mines Cooperative Research Opportunities*. Washington, DC: U.S. Bureau of Mines.

Weissberg, B.G. (1970). Solubility of gold in hydrothermal alkaline sulfide solutions. *Economic Geology*, 65, 551–556.

Westland, A.D. (1981). Inorganic chemistry of the platinum-group elements. *Canadian Institute of Mining and Metallurgy*, sp. vol. 23, 7–18.

Wood, S.A. & Mountain, B.W. (1989). Thermodynamic constraints on the solubility of platinum and palladium in hydrthermal solutions: Reassesment of hydroxide, bisulfide, and ammonia complexing. *Economic Geology*, 84, 2020–2028.

METHOD AND APPARATUS FOR EXTRACTING PRECIOUS METALS FROM THEIR ORES AND THE PRODUCT THEREOF

CROSS-REFERENCES TO RELATED APPLICATIONS

This is a continuation-in-part of application Ser. No. 08/265,322 entitled "Biocatalyzed Leaching of Precious Metal Values," filed Jun. 24, 1994, now U.S. Pat. No. 5,449,397 the disclosure of which is incorporated by reference as if fully set forth herein.

This invention was made with Government support under Small Business Innovation Research Grant No. DMI-9461234 which was awarded by the National Science Foundation, an independent agency of the U.S. Government. The U.S. Government has certain rights in the invention.

BACKGROUND OF THE INVENTION

The background of the invention is set forth in two parts: the field of the invention and the description of related art.

1. Field of the Invention

This invention relates to a method and apparatus for extracting precious metals from their ores and the product thereof. In particular, it relates to the following: (1) a biohydrometallurgical process and apparatus for extraction and recovery of gold, silver and platinum group elements from their ores; (2) the products of that process and apparatus.

2. Description of Related Art

Development of cost-effective techniques for extraction of precious metals from their ores has been a goal of metallurgists for hundreds of years. In recent years, the addition of environmental costs to the total cost of products of precious metal miners has encouraged a search for environmentally acceptable options, especially for refractory ores.

The first step in prior art precious metal production from ore involves preparing the ore for precious metal extraction. Preparation can take any one of a number of courses depending on the character of the ore. Gold and silver ores often contain metallic sulfides. Ores containing platinum-group elements (PGE) typically also contain metallic sulfides. For example, in the Bushveld Igneous Complex in South Africa, platinum group element values occur in solid solution in the base-metal sulfides pyrrhotite ($Fe_{1-x}S$), pentlandite ($Fe,Ni)_9S_8$, pyrite ($FeS_2$), and as the discrete platinoid metal minerals cooperite (PtS), laurite ($RuS_2$), braggite (Pt,Pd,Ni)S and Pt-Fe alloys or their intergrowths (see Guilbert, J. M. & Park, C. F., Jr. "*The geology of ore deposits.*" New York: W. H. Freeman and Company, 1986). The Stillwater Complex in Montana is a similar deposit. Typically, refractory, non-oxidized (e.g., sulfide) gold and silver ores (especially those with a relatively high carbon content) are oxidized at elevated temperatures and pressures in large autoclaves (i.e., "roasted"), prior to precious metals extraction by means of cyanide leaching, (see McQuiston, Jr., F. W., & Shoemaker, R. S., *Gold and Silver Cyanidation Plant Practice*, Vol. II, Baltimore: Port City Press, 1980).

During the last decade, heap leach processes for cost-effective bio-oxidation of pyritic and arsenopyritic sulfides in gold and silver ores have been developed to the point of commercial application (see Torma, A. E., *Biotechnology: A Comprehensive Treatise* in 8 Volumes, Deerfield Beach, Fla.: Verlag Chemie, 1981). Recent improvements in the art are disclosed by Pooley et al. in U.S. Pat. No. 4,822,413, Apr. 18, 1989; by Hackl et al. in U.S. Pat. No. 4,987,081, Jan. 22, 1991; by Hunter in U.S. Pat. No. 5,076,927, Dec. 31, 1991; by Brierly et al. In U.S. Pat. No. 5,127,942, Jul. 7, 1992; and by Brierly and Hill in U.S. Pat. No. 5,246,486, Sep. 21, 1993. The disclosures in the aforementioned patents are incorporated by reference herein as if fully set forth. A great variety of precious metal extraction processes have also been developed (see Gupta, C. K., & Mukherjee, T. K., *Hydrometallurgy in Extraction Processes*, Vol. I, Boston: CRC Press, 1990). Precious metal extraction processes are disclosed by Pesic in U.S. Pat. No. 4,778,519, Oct. 18, 1988; by Ball et al. in U.S. Pat. No. 4,902,345, Feb. 20, 1990; and by Kandemir in UK Pat. No. 2,180,829, published Apr. 8, 1987. The disclosures of the aforementioned patents are incorporated by reference herein as if fully set forth. The relatively low economic cost of cyanidation, however, has ensured its proliferation.

State-of-the-art precious metal heap leach practice varies with the nature of the ore. Bio-oxidation process steps may include ore crushing, acid pretreatment, inoculation with appropriate sulfide-oxidizing bacteria, addition of nutrients, recirculating the biolixiviant and cooling the heap (for 3 to 8 days at a time), and allowing the heap to "rest" (for 3 to 8 days at a time). Precious metal extraction by means of cyanidation may include the process steps of washing the heap for an extended period (e.g., 14 days) to remove residual acidity or iron content, breaking the heap apart in order to agglomerate it with cement and/or lime to make a new heap, leaching it with an alkaline cyanide or thiosulfate solution for 30 to 40 days, and recovery of gold and silver from the leach solution by adsorption on activated carbon or zinc dust precipitation.

A significant amount of work in the field of bio-oxidation and metals extraction has been accomplished by a variety of investigators. Tomizuka, N. & Yagisawa, M., in "Optimum conditions for leaching of uranium and oxidation of lead sulfide with thiobacillus ferrooxidans and recovery of metals from bacterial leaching solution with sulfated-reducing bacteria," (in *Metallurgical Applications of Bacterial Leaching and Related Microbiological Phenomena*, Murr, L. E., Torma, A. E., & Brierly, J. A. (Eds.) New York: Academic Press, 1978), describe a two-step process for leaching of uranium and oxidation of lead sulfide where recovery of metals is accomplished by means of microbial sulfate reduction. Alper, J., in "Bacterial methods may strike it rich in refining metals, cleaning coal," (*High Technology*, April, 1984, pp. 32–35), describes the bio-oxidation of gold-bearing arsenopyrite/pyrite and notes that production of large amounts of arsenic and sulfurous gases is avoided. Torma, A. E., in *Biotechnology: A Comprehensive Treatise in 8 Volumes*, (Deerfield Beach, Fla.: Verlag Chemie, 1988), reviewed bioleaching processes. Livesay-Goldblatt, E., in *Fundamental and Applied Biohydrometallurgy*, (Proc. 6th International Symposium on Biohydrometallurgy, Vancouver, B.C. 89–96, 1986), described a process for gold recovery from arsenopyrite/pyrite ore by bacterial leaching and cyanidation. Torma, A. E., in "*Biotechnology: A comprehensive treatise in 8 volumes,*" (Deerfield Beach, Fla.: Verlag Chemie, 1988), reviews bio-oxidation of gold and silver ores. Hackl, R. P., Wright, F., & Bruynesteyn, A., in *Proceedings of the Third Annual General Meeting of Biominet*, (Aug. 20–21, 71–90, 1986), described development of the BIOTANKLEACH process for leaching pyritic materials from gold and silver ore. The results of bench-scale and pilot-scale evaluations were presented. Marchant, P. B., & Lawrence, R. W., in "Flowsheet design, process control, and operating strategies in the bio-oxidation of refractory gold ores," (*Proceedings of the Third Annual General Meeting of Biominet*, Aug. 20–21, 39–51, 1986), listed considerations in the design of commercial bio-oxidation plants. Lawrence R. W., in "Biotreatment of Gold," (*Microbial Mineral Recovery* New York.: McGraw-Hill edited by Ehrlich, H. L. and Brierly, C. L., 1990), discussed biotreatment of gold ore. The benefits of using the BacTech moderately thermophilic cultures in bio-oxidation processes were discussed by Budden, J. R., & Spencer, P. A. in "Tolerance to temperature and water quality for bacterial oxidation: The benefits of BacTech's moderately thermophilic culture," (*FEMS Microbiology Reviews*, 11, 191–196, 1993). Chapman, J. T., Marchant, P. B., Lawrence, R. W., & Knopp, R., in "Biooxidation of a refractory gold bearing high arsenic sulphide concentrate: A pilot study," (*FEMS Microbiology Reviews*, 11, 243–252, 1993), described a modular mobile bioleach pilot plant for bio-oxidation of a refractory gold-bearing high-arsenic sulfide concentrate. Moffat, A. S., in "Microbial mining boosts the environment," (*Science*, 264, 778–779, 1994), disclosed how bio-oxidation can increase the efficiency of mining.

Thermophilic versus mesophilic bioleaching process performance was evaluated by Duarte, J. C., Estrada, P. C., Pereira, P. C., & Beaumont, H. P. in "*FEMS Microbiology Reviews*, 11, 97–102, 1993. Two years of BIOX bio-oxidation pilot plant data were analyzed by Hansford, G. S., & Miller, D. M. in "Biooxidation of a gold-bearing pyrite-arsenopyrite concentrate," *FEMS Microbiology Reviews*, 11, 175–182, 1993. Hoffman, W., Katsikaros, N., & Davis, G., in "Design of a reactor bioleach process for refractory gold treatment," (*FEMS Microbiology Reviews*, 11, 221–230, 1994), described the design of a reactor bioleach process for refractory gold treatment. Liu, X., Petersson, S., & Sandstrom, A., in "Evaluation of process variables in bench-scale bio-oxidation of the Olympias concentrate," (*FEMS Microbiology Reviews*, 11, 207–214, 1993), presented an evaluation of the effects of process variables on pyrite/arsenopyrite oxidation and gold extraction. Maturana, H., Lagos, U., Flores, V., Gaeta, M., Cornejo, L., & Wiertz, J. V., in "Integrated biological process for the treatment of a Chilean complex gold ore," (*FEMS Microbiology Reviews*, 11, 215–220, 1993), described an integrated biological process for treatment of a complex gold ore. Mineral sulfide oxidation by enrichment cultures of a novel thermoacidophilic bacteria were described by Norris, P. R. & Owen, J. P. in "Mineral sulphide oxidation by enrichment cultures of novel thermoacidophilic bacteria," *FEMS Microbiology Reviews*, 11, 51–56, 1993). Rate controls on the bio-oxidation of heaps of pyritic material imposed by bacterial upper temperature limits were described by Pantelis, G. & Ritchie, A. I. M. in "Rate controls on the oxidation of heaps of pyritic material imposed by upper temperature limits on the bacterially catalysed process," (*FEMS Microbiology Reviews*, 11, 183–190, 1993). Bio-oxidation bacteria have been characterized in detail. Brierly, C. L., & Brierly, J. A., in "A chemoautotrophic and thermophilic microorganism isolated from an acid hot spring," (*Canadian J. Microbiology*, 19, 183–188, 1973), characterized a chemoautotrophic and thermophilic (70° C.) microorganism isolated from an acid hot spring. De Rosa, M., Gambacorta, A., & Bullock, J. D., in "Extremely thermophilic acidophilic bacteria convergent with *Sulfolobus acidocaldarius*," (*J. General Microbiology*, 86, 156–164, 1975), characterized the extremely thermophilic (85° C.), acidophilic (pH 1.0) bacteria *Sulfolobus acidocaldarius*.

While prior art has extensively studied and developed the bio-oxidation process for oxidizing metal sulfides present in gold and silver ore to expose or mobilize precious metal values, little attention has been given to biotechnologies for extracting (solubilizing) and recovering those values. Torma, A. E., in "Biotechnology: A Comprehensive Treatise in 8 Volumes," (Deerfield Beach, Fla.: Verlag Chemie, 1988), reviewed dissolution of gold by microorganisms. Olson, G. J., in "Microbial oxidation of gold ores and gold bioleaching," (*FEMS Microbiology Letters*, 119, 1–6, 1994), reviewed microbial oxidation of gold ores and gold bioleaching. He described cyanogenic microorganisms such as *Chromobacterium violaceum*, and he noted that gold forms soluble sulfide and polysulfide complexes and suggested that biogenesis of partially-oxidized sulfur compounds may be a mechanism of gold dissolution. The U.S. Bureau of Mines, (Office of Technology Transfer in *U.S. Bureau of Mines Cooperative Research Opportunities*, Washington, DC: U.S. Bureau of Mines, 1995), disclosed that the solubility of gold in dilute polysulfide solutions at elevated temperatures and pressures and neutral pH levels is comparable to the solubility of gold in cyanide solutions.

Investigators have hypothesized natural processes for gold solubilization involving specific sulfide-oxidizing bacteria such as *Thiobacillus ferroxidans* and *Thiobacillus denitrificans* (see Lyalikova, N. N. & Mokeicheva, L. Y. in "The role of bacteria in gold migration in deposits," *Microbiology*, 38: 805–810, 1969; Kulibakin, V. G., Roslyakow, N. A., Tsimbalist, V. G., Mel'nikova, R. D., and Nepeina, L. A., in "Role of sulfur bacteria in supergene migration and concentration of gold," Trans. Inst. Geol. Geofiz. Akad. SSSR Sib. Otd., 370: 75–86, 1977 (in Russian)) and sulfate-reducing bacteria such as Desulfovibrio (see Meyers, W. B. "An hypothesis of the chemical environment of the Rand Goldfield, South Africa" *U.S. Geological Survey Open-File Report*1389, 1970; Meyers W. B. "Precambrian pyritic gold- and uranium-bearing conglomerates" Geological Society of America, *Abstracts with Programs*, 3: 656–657, 1971; Myers, W. B., "Genesis of Uranium and Gold-Bearing Precambrian Quartz-Pebble Conglomerates" *Geological Survey Professional Paper* 1161-AA, 1981; and Mossman, D. J. & Dyer, B. D. "The geochemistry of Witwatersrand-type gold deposits and the possible influence of ancient prokaryotic communities on gold dissolution and precipitation" *Precambrian Research*, 30: 303–319, 1985).

Speculation concerning the impact of biological organisms on the solubilization of gold and silver by bisulfide complexes is based on the findings of those who have studied the formation of precious metal-bisulfide complexes abiotically. Krauskopf, K. B., in "The solubility of gold," (*Economic Geology*, 46, 858–870, 1951), disclosed that "gold may be transported in alkaline sulfide solutions, even in dilute solutions near the neutral point" and "experimentally, one of the most perplexing facts about the chemistry of gold is its ability to dissolve in solutions of $HS^-$ of moderate concentration even at room temperature, whereas it dissolves in $S^{-2}$ (i.e., more alkaline solutions) only in concentrated solutions at high temperature." Barnes, H. L. in "*Geochemistry of hydrothermal ore deposits*," (New York: Hold, Rinehart & Winston, Inc., 1967), disclosed that "gold is known to be soluble in alkaline solutions containing bisulfide or sulfide ion" and that "when the pH is increased to 7.0 at constant $\Sigma S$, $HS^-$ increases relative to $H_2S$ and the solubilities (of silver) summarized by Anderson rise abruptly by a factor of 20." (See Anderson, G. M. "The solubility of PbS in $H_2S$-water solutions," *Economic Geology*, 57, 809–829, 1962). Weissberg, B. G., in "Solubility of gold in hydrothermal alkaline sulfide solutions," (*Economic*

Geology, 65, 551–556, 1970), disclosed that "in less alkaline solutions, where the HS⁻ ion predominates, the experimentally determined solubility of gold ranges from 100 to 200 ppm Au in solutions containing from 0.2 to 0.3 moles NaHS/Kg solution at temperatures between 150° and 250° C. . . . " and that "the present results are in good agreement with results given by Ogryzlo and by Lindner and Gruner and substantiate the high solubility of gold in near neutral pH bisulfide solutions." (See Ogryzlo, S. P. "Hydrothermal experiments with gold," *Economic Geology*, 30, 400–424, 1935; and Linder, J. L. & Gruner, J. W. "Action of alkali sulphide solutions on minerals at elevated temperatures," *Economic Geology*, 34, 537–560, 1939). Seward, T. M., in "Thio complexes of gold and the transport of gold in hydrothermal ore solution," (*Geochimica et cosmochimica Acta*, 37, 379–399, 1973), disclosed that " . . . an increase in the bisulfide ion concentration at constant pH (or HS⁻/H₂S ratio) leads to higher gold solubilities" and that "considerable quantities of gold may be transported in hydrothermal ore solutions as thio complexes, particularly in the near neutral pH region where the Au(HS)$_2^-$ complex predominates." Seward, T. M., in "The stability of chloride complexes of silver in hydrothermal solutions up to 350° C., " (*Geochimica et Cosmochimica Acta*, 40, 1329–1341, 1976), disclosed that "the solubility data (up to 180° C.) of Melent'yev et al. suggest that Ag(HS)$_2^-$ will probably be important in near neutral hydrothermal solutions . . . . " (See Melent'yev, B. N., Ivanenko, V. V., and Pamfilova, L. A. "Solubility of some ore-forming sulfides under hydrothermal conditions," *Rastvorimost' nekotorykh rudoobrazuyushkikh sul'fidov v gidrotermal' nykh usloviyakh' Moskva*, 27–102, 1968). Mountain, B. W. & Wood, S. A., in "Chemical controls on the solubility, transport, and deposition of platinum and palladium in hydrothermal solutions: A thermodynamic approach," (*Economic Geology*, 83, 492–510, 1988), disclosed that "Westland states that Pt is soluble in alkaline sulfide solutions, possibly a [Pt(HS)$_x$(OH)$_{4-x}$]⁻ complexes. Recent experiments . . . have yielded Pt concentrations of about 1 ppm after one month for Pt metal in contact with a 1.0 m Na₂S solution." (See Westland, A. D., "Inorganic chemistry of the platinum-group elements," *Canadian Inst. Mining Metallurgy Spec. Vol.* 23, 7–18). Gammons, C. H. & Barnes, H. L., in "The solubility of Ag₂S in near-neutral aqueous sulfide solutions at 25° to 300° C.," (*Geochimica et Cosmochimica Acta*, 53, 279–290, 1989), disclosed that "Ag(HS)$_2^-$ is the dominant silver species in hydrothermal fluids with near-neutral to alkaline pH, relatively low oxidation state, high total sulfide, and T<300° C. . . . " Shenberger, D. M. & Barnes, H. L., in "Solubility of gold in aqueous sulfide solutions from 150° to 350° C.," (*Geochimica et Cosmochimica Acta*, 53, 269–278, 1989), disclosed that "the fact that gold is soluble in alkaline sulfide solutions has been known since at least the 17th century . . . " and that "the high stability of Au(HS)$_2^-$ indicates that geologically significant quantities of gold can be transported in typical hydrothermal solutions." Wood, S. A. & Mountain, B. W., in "Thermodynamic constraints on the solubility of platinum and palladium in hydrothermal solutions: Reassessment of hydroxide, bisulfide, and ammonia complexing," (*Economic Geology*, 84, 2020–2028, 1989), disclosed " . . . Pt solubilities on the order of 10 to 100 ppb are attainable in bisulfide solutions at alkaline pH at 25 degrees C." and that "Pt and Pd bisulfide complexes show a strong similarity to Ag and Au bisulfide complexes, where the Au(HS)$_2^-$ complex predominates over a wide range of conditions." Gammons, C. H., Bloom, M. S., & Yu, Y., in "Experimental investigation of the hydrothermal geochemistry of platinum and palladium: I. Solubility of platinum and palladium sulfide minerals in NaCl/H₂SO₄ solutions at 300° C.," (*Geochimca et Cosmochimica Acta*, 56, 3881–3894, 1992), disclosed " . . . a broad similarity in the chemical behavior of Au and the PGE elements."

In evaluating the potential for transport of precious metals in natural systems as bisulfide complexes in hydrothermal fluids, investigators have assumed the hydrogen fugacity in their abiotic systems is set by the mineral assemblages through which the fluids would move in nature. For example, Weissberg, B. G., in "Solubility of gold in hydrothermal alkaline sulfide solutions," (*Economic Geology*, 65, 551–556, 1970), disclosed that " . . . the solubility of gold in natural systems depends on the hydrogen fugacity, which is controlled principally by equilibria between the minerals pyrrhotite, pyrite, magnitite and hematite." Seward, T. M., in "Thio complexes of gold and the transport of gold in hydrothermal ore solutions," (*Geochimica et Cosmochimica Acta*, 37, 379–399, 1973), disclosed that "since the dissolution of gold is a function of hydrogen fugacity (see, for example, Raynnahashay, B. C. & Holland, H. D., "Redox reactions accompanying hydrothermal wall rock alteration", *Economic Geology*, 64, 291–305, 1969), a pyrite-pyrrhotite 'redox' buffer was present in all experiments in order that the $f_{H2}$ was maintained at a known value."

In the field of biological waste degradation, investigators have long understood and utilized the bioprocessing opportunities presented by "interspecies hydrogen transfer" between hydrogen-producing and hydrogen-consuming anaerobic microorganisms. A biohydrometallurgical application of this knowledge was disclosed by Hunter, R. M., in "*Biocatalyzed Partial Demineralization of Acidic Metal-Sulfate Solutions*," (Ph.D. Thesis, Montana State University, 1989) and by Hunter, R. M. in "*Biocatalyzed Partial Demineralization of Acidic Metal-Sulfate Solutions*," (U.S. Pat. No. 5,076,927, Dec. 31, 1991), the disclosure of which patent is incorporated herein as if fully set forth. Microbial hydrogen management techniques are disclosed by Harper, S. R. & Pohland, F. G. in "Recent developments in hydrogen management during anaerobic biological wastewater treatment," (*Biotechnology and Bioengineering*, 28, 585–602, 1986). The following reactions illustrate the consumption of hydrogen by acetogens (ACET), methanogens (METH), sulfate-reducing bacteria (SRB) and nitrate-reducing bacteria that produce ammonium (AMM) and nitrogen (NRB):

Acetogens (acetogenic bacteria):

$$2HCO_3^- + 4H_2 + H^+ \rightarrow CH_3COO^- + 4H_2O \qquad \Delta G_o' = -104.6 kJ$$

Methanogens (methanogenic bacteria):

$$HCO_3^- + 4H_2 + H^+ \rightarrow CH_4 + 3H_2O$$

$$\Delta G_o' = -135.6 \text{ kJ}$$

Sulfate-reducing bacteria:

$$SO_4^{-2} + 4H_2 + H^+ \rightarrow HS^- + 4H_2O \qquad \Delta G_o' = -151.9 \text{ kJ}$$

Nitrate-reducing bacteria that produce ammonium:

$$NO_3^- + 4H^+ \rightarrow NH_4^- + 3H_2O \qquad \Delta G_o' = -599.6 kJ$$

Nitrate-reducing bacteria that produce nitrogen gas:

$$2NO_3^- + 5H_2 + 2H^+ \rightarrow N_2 + 6H_2O \quad \Delta G_o' = -1,120.5 \text{ kJ}$$

The negative free energies of these reactions at pH 7.0 ($\Delta G_o'$) indicate it is thermodynamically feasible for oxyanion-reducing, hydrogen-consuming bacteria to reduce hydrogen gas fugacities in reactor environments to very low levels under anaerobic conditions.

No single prior art reference or combination of references have suggested combining the knowledge of the above lines of inquiry: the arts of solubilization and transport of aerobic and precious metals in hydrothermal fluids, and the art of anaerobic bioprocessing. The prior art does not teach the use of bio-oxidation to liberate (mobilize) platinum-group elements from their ores. The prior art does not teach the use of sulfate-reducing bacteria to increase the fugacity of hydrogen sulfide gas and the activity of bisulfide ions in a reactor in order to increase the solubility of precious metal-bisulfide complexes. Neither does the prior art teach the use of microorganisms capable of biological reduction of an oxyanion to lower the hydrogen gas fugacity in a reactor in order to increase the solubility of precious metal-bisulfide complexes in the reactor. In fact, the prior art teaches away from the present invention toward aerobic processes for leaching of precious metals from their ores. Such aerobic processes are disclosed in the following recently published books on the subject: Ehrlich, H. L. (1990), *Microbial Mineral Recovery*, New York: McGraw-Hill; Gupta, C. K., & Mukherjee, T. K. (1990), *Hydrometallurgy in Extraction Processes, Vols. I and II*, Boston: CRC Press; Yannopoulos, J. C. (1991), *The extractive metallurgy of gold*, New York: Van Nostrand Reinhold; Marsden, J. & House, I. (*1993*), *The chemistry of gold extraction*, New York: Ellis Horwood.

SUMMARY OF THE INVENTION

For the purposes of this disclosure, the term "ore" refers to a composition that comprises precious metal values. Thus, ore may be a mineral assemblage that is being mined in-situ (in place) or that has been mined conventionally; or it may be a waste product, such as obsolete or damaged electronic components. The term "precious metals" refers to gold(Au), silver(Ag) and/or platinum-group elements (PGE). The term "platinum-group elements" refers to platinum(Pt), palladium(Pd), rhodium(Rh), ruthenium(Ru), osmium(Rh) and iridium(Ir). The term "bisulfide lixiviant" refers to an aqueous solution comprising $HS^-$ ions, and may also comprise dissolved $H_2S$ gas. The term "bisulfide complex" refers to a complex comprising a precious metal and bisulfide.

The present invention provides method and apparatus for leaching of precious metals from their ores by means of a leaching solution comprising bisulfide ions and having a low fugacity of hydrogen gas. The invention may be practiced on oxidized ore, sulfide ore, or otherwise refractory ore in a tank reactor operation; or in a heap leach operation. Preferably, a bio-oxidation step for removing base-metal sulfides from precious metal ores is coupled with a bisulfide precious metal leaching step, but conventional roasting may also be used to remove base-metal sulfides and produce an acidic, sulfate stream. Preferably, the leaching solution is essentially neutral or alkaline. In a preferred embodiment, the process of producing the leaching solution is biocatalyzed.

In a preferred embodiment, a first process step of bio-oxidation of ore particles is accomplished to free (liberate) precious metals dispersed or occluded within the ore. A portion of the acidic, base-metal sulfate leach solution produced by the bio-oxidation step is introduced to an anaerobic reactor. In a heap leach embodiment of the process, the anaerobic reactor is a side-stream reactor or a series of such reactors in series. In an alternative slurry (e.g., vat or tank) leaching embodiment, the anaerobic process may occur on-line. One or more preferably non-toxic electron donors (such as hydrogen gas, formate, acetate and/or methanol—which does not bind effectively to activated carbon) and growth requirements (such as vitamins and/or salts), are added to the anaerobic reactor to enrich within it a culture of at least one oxyanion-reducing bacterium (e.g., a sulfate-reducing bacterium). In an alternative embodiment, the electron donors and/or growth requirements are derived from organic material deposited on the ore by sulfide-oxidizing bacteria during the bio-oxidation step. The hydrogen fugacity in the reactor, or at least in the last reactor in a series of such reactors, is maintained at a low level by at least one hydrogen-consuming bacterium. The anaerobic reactor may be operated in a pH-stat mode by adding sufficient acidic sulfate solution to maintain a neutral pH in the reactor (see Hunter, R. M., *Biocatalyzed Partial Demineralization of Acidic Metal-Sulfate Solutions*, Ph.D. Thesis, Montana State University, 1989). In an alternative embodiment, the anaerobic reactor may be operated in a sulfide-stat mode by adding sufficient sulfate solution to maintain a constant dissolved sulfide concentration in the reactor in response to signals from a sulfide sensor (e.g., sulfide ion selective electrode). Base metals are preferably precipitated and a portion of the hydrogen sulfide gas ($H_2S$) produced in the anaerobic reactor is preferably removed. In this way, oxyanion-reducing bacteria are used to create an essentially neutral leaching solution comprising a relatively high concentration bisulfide ions, a high fugacity of hydrogen sulfide gas, a low concentration of dissolved base metals, and a low fugacity of hydrogen gas.

In an alternative embodiment, the precious metal leaching solution is produced in an anaerobic environment by contacting a stream of gas comprising hydrogen sulfide gas and essentially no hydrogen gas with the solution until the environment has an appropriately high fugacity of hydrogen sulfide gas and an appropriately low fugacity of hydrogen gas. The gas may be produced biotically by a culture of sulfate-reducing bacteria or it may be produced abiotically by purifying $H_2S$ gas to remove $H_2$ gas.

In a second process step, the oxidized ore (possibly in a heap that is covered and submerged to exclude oxygen) is leached (by recirculating the neutral or alkaline bisulfide lixiviant comprising (or saturated with) $H_2S$) in a leaching reactor. In one embodiment, the $H_2S$ partial pressure is increased by introducing the lixiviant under pressure at the bottom of a heap submerged in water, causing ion concentrations to increase in direct proportion to the increase in $H_2S$ partial pressure.

In a preferred embodiment, the anaerobic reactor and the leaching reactor are operated together as a single, essentially completely-mixed reactor. A completely mixed reactor is one that produces an effluent concentration of a conservative tracer (e.g., a non-reactive dye) equal to 37±3 percent of the initial tracer concentration (i.e., tracer mass divided by liquid volume) one detention time (i.e., liquid volume divided by liquid volumetric flow rate) after an impulse input (i.e., slug addition) of the tracer.

The complexed precious metal (e.g., gold and silver) is recovered (preferably continuously) from the lixiviant solution. Recovery may be accomplished in a conventional manner by adsorption on activated carbon or by modifying either the solution pH, hydrogen fugacity, or oxidation-reduction potential (ORP).

Recovered precious metals are converted into products. This may include the operations of separating, smelting, and casting of each precious metal into bars, bullion or other forms.

The present invention offers a variety of advantages not provided by the prior art. One object of the invention is to lower the monetary cost of gold, silver, and platinum-group element production. By utilizing a waste product (excess sulfuric acid from a roaster or bio-oxidation pretreatment step) as the starting material for preparation of a bisulfide lixiviant, the lixiviant (a neutral bisulfide solution) would be produced biologically instead of being purchased. Another object of the invention is to use both inorganic (salts) and organic (biofilm carbonaceous compounds) byproducts of bioxidization as inputs to a precious-metal solubilization process. Another object of the invention is to lower the environmental risk of precious metal mining. This is the case because the actual and perceived environmental risk of maintaining a large inventory of a neutral bisulfide solution is much is much lower than that associated with maintaining an equivalent volume of caustic cyanide solution. Another object of the invention is to provide a method and apparatus for both in-situ or ex-situ (conventional) mining. Further objects and advantages of the invention will become apparent from consideration of the drawings and the ensuing description.

BRIEF DESCRIPTION OF THE DRAWINGS

The features of the invention will be better understood by referring to the accompanying drawings which illustrate presently preferred embodiments of the invention.

In the drawings.

The following reference numerals are used to indicate the parts of the invention on the drawings:

2 ore
4 bio-oxidation reactor
6 sulfate ions
7 electron donor
8 sulfate reduction reactor
20 oxidized ore
22 bisulfide leaching reactor
24 pregnant solution
26 precious metals recovery reactor
28 leached ore
30 ore
32 crushing
34 crushed ore
36 acid leaching
37 aerobic reactor
38 air
40 acid-leach solution
42 pump
44 acid-leached ore
46 bisulfide leaching
47 essentially completely-mixed, anaerobic reactor
48 bisulfide lixiviant
50 pump
60 pH controller
62 valve
64 valve
66 pregnant bisulfide lixiviant
68 gold and silver recovery
70 spent lixiviant
76 bisulfide lixiviant recirculation loop
78 activated carbon column
80 leached ore
82 sensor/controller
84 electron donor
90 dewatering
92 contained bisulfide lixiviant
94 waste ore
96 acid-leach solution portion
98 base metal removal
100 base metal removal reactor
104 iron and other base metals
110 excess hydrogen sulfide gas
112 excess hydrogen sulfide gas portion
114 sulfur recovery
116 sulfur recovery reactor
120 elemental sulfur
200 heap
202 heap, second heap
204 crushed ore
205 crushed ore, oxidized ore
206 air
208 plenum
210 acidic, base-metal sulfate leach solution
212 pump
214 portion
216 distributor
220 portion
230 anaerobic, sulfate-reduction reactor
232 pH controller
234 valve
238 bisulfide leach solution
240 non-toxic electron donor
244 base metals
250 settling tank
252 portion
254 bisulfide lixiviant
260 headspace
262 headspace
264 conduit
266 excess hydrogen sulfide gas
270 sulfur recovery
272 elemental sulfur
282 bisulfide lixiviant
284 plenum
286 pump
290 distributor
292 portion
294 portion
300 pregnant portion
302 reactor
306 barren lixiviant solution

DESCRIPTION OF THE PREFERRED EMBODIMENTS

Figure 1:
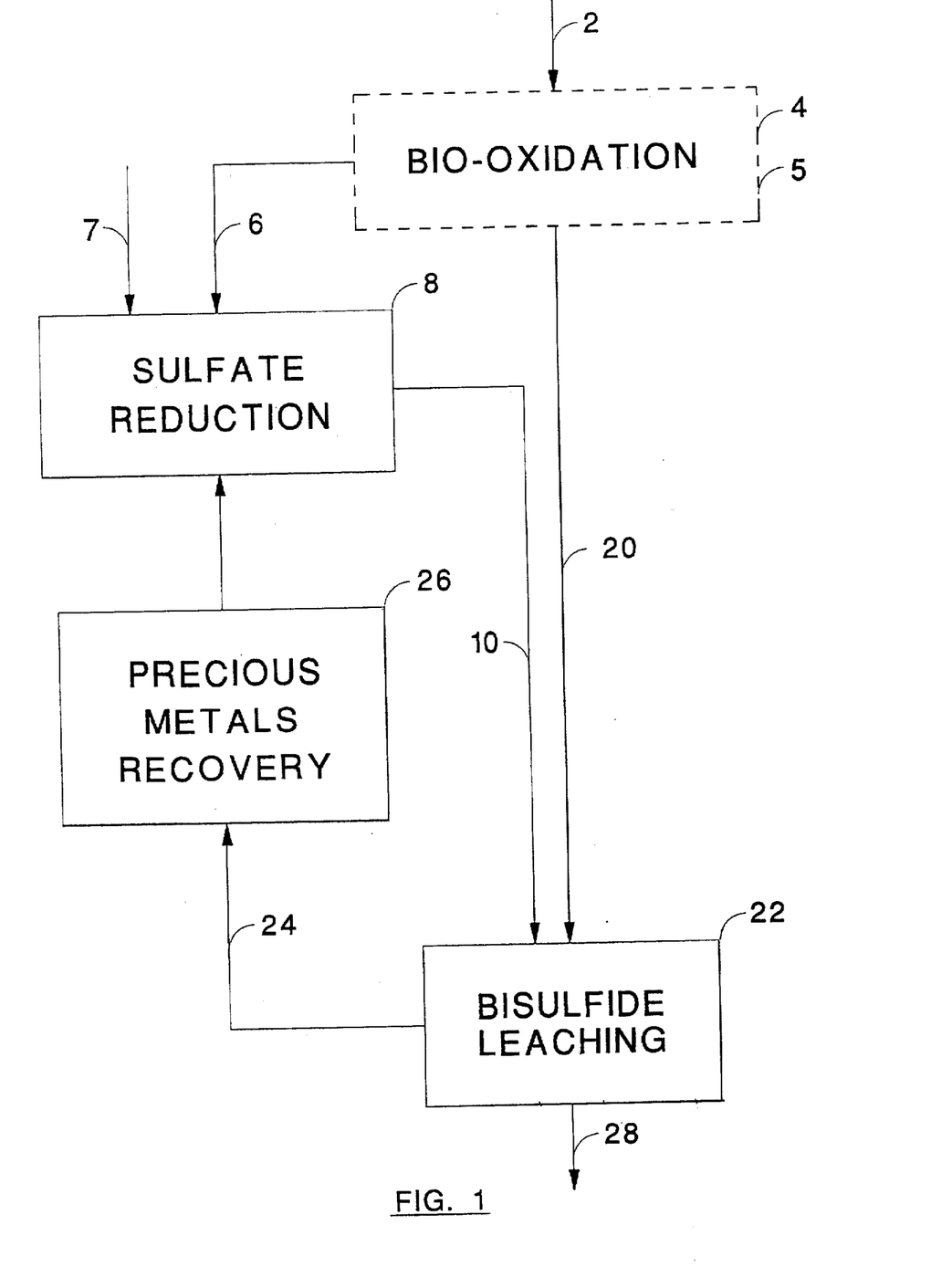
FIG. 1 is a highly schematic block diagram illustrating a first representative embodiment of the present invention.

Reference is now made to FIG. 1 which is a schematic block diagram illustrating a preferred embodiment of the invention, with the dashed lines representing possible variations in the process and apparatus. Ore 2 is the input to the process and, under certain conditions, may be the only input to the process. In a preferred embodiment, ore 2 is crushed and may be otherwise treated to optimize bio-oxidation. In bio-oxidation reactor 4, oxidation of metal sulfides is accomplished to free or mobilized precious metals dispersed or occluded within metallic sulfides in ore 2.

Bio-oxidation reactor 4 produces a sidestream comprising sulfate ions 6 and acidity. In some instances, the sidestream also comprises biofilm carbonaceous compounds. In an alternative embodiment, bio-oxidation does not occur and sulfate ions 6 are an input to the process. Sulfate ions 6 may be a component of a waste stream, such as acid mine drainage, or by-product of ore roasting.

In a preferred embodiment, electron donor 7 is added to sulfate reduction reactor 8 so that sulfate ions 6 are biologically reduced therein. In a preferred embodiment, sulfate reduction reactor 8 is operated at a mean cell residence time low enough to cause essentially-complete (99+percent) utilization of electron donor 7. In a preferred embodiment, sulfate reduction reactor 8 is operated in a pH-stat mode so as to maintain an essentially constant pH (±0.1 pH unit) in reactor 8 and in bisulfide lixiviant 10 that it produces.

Oxidized ore 20 is introduced to bisulfide leaching reactor 22. In reactor 22, precious metal values in oxidized ore 20 are dissolved and complexed by means of bisulfide lixiviant 10. Pregnant solution 24 comprising precious metal values is introduced to precious metals recovery reactor 26 for precious metals recovery in a conventional manner by adsorption on activated carbon or by modifying either the solution pH, hydrogen fugacity, or oxidation-reduction potential (ORP). A product (e.g., gold bullion) is formed from said precious metal by smelting and casting. Leached ore 28 is disposed of in a conventional manner and need not be treated for removal of lixiviant.

It is well known in the art that the composition of ores varies widely, requiring optimization of the leaching step based on ore compositions and other local conditions. For this reason, design and operation of reactors 8 and 26 is preferably optimized for precious metal dissolution and complex formation. Depending on ore composition, design and/or operation are varied to achieve the following conditions in the reactor environment:

1. Maximize dissolved bisulfide concentration and $H_2S$ fugacity
2. Optimize pH
3. Minimize hydrogen fugacity
4. Maximize pressure
5. Maximize temperature For gold and/or silver leaching, information on the aqueous chemistry of gold and silver bisulfide complexes and other chemical species likely to be present in a bisulfide lixiviant is used (see Barnes, H. L. (ed.), *Geochemistry of Hydrothermal Ore Deposits*, 2nd ed., New York: John Wiley & Sons, 1979). Published information on the aqueous chemistry of gold and silver bisulfide complexes and other chemical species likely to be present in a bisulfide lixiviant are used to produce a mathematical model of the solubilization step. The model incorporates the data presented in Table 1. In the model, stability constants are used to predict the direction of a reversible chemical reaction under certain standard conditions and under other conditions. The standard conditions are 1.0 molar (M) concentrations of dissolved reactants and products and 1.0 atmosphere (Atm) pressure of gaseous reactants and products. The temperature is usually taken as 25° C. (298° K), but stability constants are reported at other temperatures as well.

TABLE 1

Stabilities of Metal Sulfides and Sulfide Complexes

| Metal/reaction | Temperature, °C. | Ionic strength | Log K |
|---|---|---|---|
| Cadmium | | | |
| $CdS + H_2S_{(aq)} \rightarrow Cd(HS)_2$ | 25 | 1.0 | −4.57 |
| $CdS + H_2S_{(aq)} + HS^- \rightarrow Cd(HS)_3^-$ | 25 | 1.0 | −2.69 |
| $CdS + H_2S_{(aq)} + 2HS^- \rightarrow Cd(HS)_4^{-2}$ | 25 | 1.0 | −0.33 |
| Copper | 22 | 2.1 to 4.4 | +2.02 ± 0.26 |
| $Cu_2S + 5HS^- + H^+ \rightarrow 2Cu(HS)_3^{-2}$ | | | |
| Gold | | | |
| $Au_{(s)} + HS^- \rightarrow AuS^- + 0.5H_{2(g)}$ | 25 | — | −5.6[a] |
| | 25 | — | −3.9 to −4.3 |
| | 25 | — | −6 |
| | 250 | — | −3.3 |
| $Au_{(s)} + H_2S \rightarrow AuHS^0 + 0.5H_{2(g)}$ | 25 | — | −11.14 ± 0.2 |
| $Au_{(s)} + H_2S_{(aq)} + HS^- \rightarrow Au(HS)_2^- + 0.5H_{2(g)}$ | 20 | — | −6.1 |
| | 25 | — | −5.54 ± 0.2 |
| | 150 | — | −2.39 ± 0.2 |
| | 175 | 0.50 | −1.29[b] |
| | 200 | 0.50 | −1.28 |
| | 200 | — | −1.89 ± 0.2 |
| $2Au + H_2S_{(aq)} + 2HS^- \rightarrow Au_2S(HS)_2^- + H_{2(g)}$ | 175 | 0.50 | −2.14 |
| | 200 | 0.50 | −2.40 |
| $2Au + S_2^{-2} \rightarrow 2AuS^-$ | 25 | — | −2.02 |
| $2Au + 2HS^- + 0.5O_2 \rightarrow 2AuS^- + H_2O$ | 25 | — | +30.35 |
| $2Au + 2HS^- \rightarrow Au_2S + H_{2(g)} + S^{-2}$ | 25 | — | −11.25 |
| Lead | | | |
| $PbS + H_2S_{(aq)} + HS^- \rightarrow Pb(HS)_3^-$ | 25 | 0 | −5.62 ± 0.2 |
| | 100 | 0 | −5.49 ± 0.2 |
| $PbS + H_2S_{(aq)} \rightarrow Pb(HS)_{2(aq)}$ | 25 | 0 | −7.6[c] |
| | 100 | 0 | −4.97 |
| | 200 | 0 | −4.78 |
| $PbS + 2H_2S_{(aq)} \rightarrow PbS(H_2S)_{2(aq)}$ | 200 | 0 | −4.88 |
| Mercury | | | |
| $HgS + 2H_2S_{(aq)} \rightarrow HgS(H_2S)_{2(aq)}$ | 20 | 1.0 | −4.25[d] |
| $HgS + H_2S_{(aq)} + HS^- \rightarrow Hg(HS)_3^-$ | 20 | 1.0 | −3.50 |
| $HgS + 2HS^- \rightarrow HgS(HS)_2^{-2}$ | 20 | 1.0 | −3.51[d] |
| $HgS + HS^- + OH^- \rightarrow HgS_2^{-2} + H_2O_{(aq)}$ | 25 | 0 | 0.31[e] |
| Silver | | | |
| $Ag_{(s)} + H_2S_{(aq)} + HS^- \rightarrow Ag(HS)_2^- + 0.5H_{2(g)}$ | 25 | — | −2.72 ± 0.10 |
| | 50 | — | −2.48 ± 0.10 |
| | 100 | — | −2.09 ± 0.10 |
| | 150 | — | −1.79 ± 0.10 |
| | 200 | — | −1.55 ± 0.10 |
| $Ag^+ + HS^- \rightarrow AgHS_{(aq)}$ | 20 | 1.0 | +13.30 |
| | 25 | 1.0 to 0.1 | +13.30 to +13.6 |
| $Ag^+ + 2HS^- \rightarrow Ag(HS)_2^-$ | 20 | 1.0 | +3.87 |
| | 25 | 1.0 to 0.1 | +17.17 to +17.7 |
| $2Ag(HS)_2^- \rightarrow Ag_2S(HS)_2^{-2} + H_2S_{(aq)}$ | 25 | 1.0 | +3.2 |
| $Ag_2S + H_2S \rightarrow 2AgSH$ | 20 | 1.0 | −15.78 |
| $Ag_2S + H_2S + 2HS^- \rightarrow 2Ag(SH)_2^-$ | 20 | 1.0 | −8.05 |
| | 25 | — | −3.82 ± 0.10 |
| | 100 | — | −3.26 ± 0.10 |
| | 150 | — | −2.91 ± 0.10 |
| | 200 | — | −2.55 ± 0.10 |

TABLE 1-continued

Stabilities of Metal Sulfides and Sulfide Complexes

| Metal/reaction | Temperature, °C. | Ionic strength | Log K |
|---|---|---|---|
| Zinc | | | |
| $ZnS + 2H_2S_{(aq)} \rightarrow ZnS(H_2S)_{2(aq)}$ | 80 | — | 2.24 |
| $ZnS + H_2S_{(aq)} + HS^- \rightarrow Zn(HS)_3^-$ | 25 | 1.0 | −3.0 ± 0.4 |
|  | 80 | — | −1.89 |
| $ZnS + H_2S_{(aq)} + 2HS^- \rightarrow Zn(HS)_4^{-2}$ | 25 | 1.0 | −2.6 |

*Stoichiometry unproven.
bTotal sulfide is 0.5M, and pressure is 1,000 bar.
cLess certain
dSolid phase is metacinnabar
ePressure is 1 bar Stability constants can be derived in a number of ways. The stability constant for a reaction is related to the standard free energy change the reaction as follows:

$$\Delta G° = -RT \ln K$$

$$\ln K = -\Delta G°/RT$$

$$\log K = -\Delta G°/2.30*RT$$

where $\Delta G°$ = free energy change under standard conditions, kJ

R = gas law constant = 0.008314 kJ/(mol*°K)

T = absolute temperature in degrees Kelvin (°K)

2.30 = ln 10

The value of the product (2.3*RT) is 4.1840*1.3636 K cal/reaction = 5,705 kJ/reaction at 25° C. and 5,935 kJ/reaction at 37° C.

An opportunity for the solubilization of precious metal (e.g., gold, silver, platinum, and palladium) is created by the complex-forming reactions:

$$Au_{(s)} + H_2S_{(aq)} + HS^- \rightarrow Au(HS)_2^- + 0.5H_{2(g)}$$

$$Ag_{(s)} + H_2S_{(aq)} + HS^- \rightarrow Ag(HS)_2^- + 0.5H_{2(g)}$$

$$Pt_{(s)} + 2H_2S_{(aq)} + 2HS^- \rightarrow Pt(HS)_4^{-2} + H_{2(g)}$$

$$Pd_{(s)} + 2H_2S_{(aq)} + 2HS^- \rightarrow Pd(HS)_4^{-2} + H_{2(g)}$$

The stability constants for the gold and silver reactions have been determined experimentally and are dependent on the temperature at which they occur. Shenberger, D. M. & Barnes, H. L., in "Solubility of gold in aqueous sulfide solutions from 150° to 350° C.," (*Geochimica et Cosmochimica Acta*, 53, 269–278, 1989), have derived the following equation for the temperature dependence of the first reaction (between 150° to 350° C.):

$$\log -K_{Au(HS)2} = -9.383*10^5/T^2 + 2170.4/T - 2.2816$$

where T = temperature in degrees Kelvin
The following equation applies between 25° C. and 150° C.:

$$\log K_{Au(HS)2} = 3.32 + (-2,420/T)$$

Similarly, Gammons, C. H. & Barnes, H. L., in "The solubility of $Ag_2S$ in near-neutral aqueous sulfide solutions at 25° to 300° C.," (*Geochimica et Cosmochimica Acta*, 53, 279–290, 1989), have derived the following equation for the temperature dependence of the second reaction:

$$\log K_{Ag(HS)2} = 0.439 - 943/T$$

The stability constants for the platinum group element reactions can be estimated using the methods disclosed by Hancock, R. D., Finkelstein, N. P., & Evers, A., in "A linear free-energy relation involving the formation constants of palladium(II) and platinum(II)," (*Journal of Inorganic and Nuclear Chemistry*, 39, 1031–1034, 1977) and Mountain, B. W. & Wood, S. A., in "Chemical controls on the solubility, transport, and deposition of platinum and palladium in hydrothermal solutions: A thermodynamic approach," (*Economic Geology*, 83, 492–510, 1988). They have demonstrated that, for metals in the group Au, Ag, Pt and Pd, plots of the logarithms of the stability constants of one metal versus another are linear for a variety of ligands.

These stability constants may be used to determine the equilibrium molar concentration of each complex using the following equations:

The above equations are used to estimate the hydrogen fugacity required to solubilize gold and silver at various temperatures and at two reactant ($H_2S + HS^-$) concentrations. Those estimates for gold and silver are presented in Table 2. Since anaerobic digesters must be operated at $H_{2(g)}$ fugacities below about $10^{-4}$ atmosphere (atm), achievement of the fugacities indicated in Table 2 are feasible. This would produce gold and silver concentrations in a pregnant bisulfide lixiviant of 0.1 to 1.0 mg/l and 1.0 to 10 mg/l, respectively, which are the same concentrations that occur in pregnant cyanide leach solutions during conventional cyanidation.

TABLE 2

Hydrogen Gas Fugacity Required to Solubilize Gold and Silver

| Metal concentration/ ligand concentration* | Log of hydrogen gas ($H_{2(g)}$), fugacity, atm, required at indicated temperature, °C. to achieve indicated metal concentration | | |
|---|---|---|---|
|  | 25 | 35 | 65 |
| Gold, 0.1 mg/l Au | | | |
| 1,400 mg/l $H_2S_{(aq)}$ + $HS^-$ | −5.29 | −3.29 | −1.89 |
| 2,700 mg/l $H_2S_{(aq)}$ + $HS^-$ | −3.08 | −2.08 | −0.68 |
| Gold, 1.0 mg/l Au | | | |
| 1,400 mg/l $H_2S_{(aq)}$ + $HS^-$ | −7.29 | −5.29 | −3.89 |
| 2,700 mg/l $H_2S_{(aq)}$ + $HS^-$ | −6.08 | −4.08 | −2.68 |
| Silver, 1.0 mg/l Ag | | | |
| 1,400 mg/l $H_2S_{(aq)}$ + $HS^-$ | −2.17 | −1.97 | −1.43 |
| 2,700 mg/l $H_2S_{(aq)}$ + $HS^-$ | −0.97 | −0.77 | −0.23 |
| Silver, 10 mg/l Ag | | | |
| 1,400 mg/l $H_2S_{(aq)}$ + $HS^-$ | −4.17 | −3.97 | −3.43 |
| 2,700 mg/l $H_2S_{(aq)}$ + $HS^-$ | −2.97 | −2.77 | −2.23 |

*Concentration of each reactant ($H_2S$ or $HS^-$) is about half of the indicated total.

In a preferred embodiment, bisulfide ions are generated biologically (by naturally-occurring sulfate-reducing bacteria) at very low cost using an acidic waste product (bio-oxidation heap leach effluent) as the sulfate source. For example, with formate ion as the electron donor, the following reaction occurs:

With acetate ion as the electron donor, the following reaction occurs:

A mass balance on typical heap leach effluents has shown that biological reduction of contained sulfate ions produces bisulfide and sulfide ions in excess of the concentration required for essentially complete base metals precipitation (see Hunter thesis, 1989). Thus, production of a high-concentration bisulfide lixiviant is possible.

A variety of techniques may be used to maximize bisulfide concentrations in the lixiviant. The solubility of hydrogen sulfides in water decreases with increasing temperature (from about 7,100 mg/l at 0° C. to 3,000 mg/l at 30° C. under a partial pressure of one atmosphere), (Environmental Protection Agency, *Process Design Manual for Sulfide Control in Sanitary Sewerage Systems*, EPA 625/1-74-005, October 1974). In accordance with Henry's law, the saturation concentration of $H_2S$ in water is directly proportional to the partial pressure of the gas in the atmosphere in contact with the liquid. Saturation of a solution with HzS lowers the pH of the solution (see Melent'yev, B. N., Ivanenko, V. V., and Pamfilova, L. A. "Solubility of some ore-forming sulfides under hydrothermal conditions," *Rastvorimost' nekotorykh rudoobrazuyushkikh sul'fidov v gidrotermal' nykh usloviyakh' Moskva*, 27–102, 1968), whereas removal of $H_2S$ increases the pH of the solution (by removing protons). Moreover, the proportion of bisulfide ion (relative to $H_2S$) increases with pH over at least the range pH 5–9.

The optimal pH for the bisulfide lixiviant solution for precious metal recovery is the pH that maximizes the solubility of target precious metal compounds and the stability of their complexes. For example, Krauskopf, K. B., in "The solubility of gold" *Economic Geology*, (46, 858–870, 1951), noted that "one of the most perplexing facts about the chemistry of gold is its ability to dissolve in solutions of $HS^-$ of moderate concentration even at room temperature, whereas it dissolves in $S^{-2}$ (i.e., more alkaline solutions) only in concentrated solutions at high temperature." Schwarzenbach, von G. & Widmer, M., in "Die loslichkeit von Metallsulfiden," (*Helvetica Chimica Acta*, 49, 111–123, 1966), found that the solubility of silver was greatest at pH 7 at a temperature of 20° C. in the presence of excess sulfide in the form of $H_2S$, $HS^-_{4-x}$ and $S^{-2}$. Melent'yev, B. N., Ivanenko, V. V., and Pamfilova, L. A., in "Solubility of some ore-forming sulfides under hydrothermal conditions," (*Rastvorimost'nekotorykh rudoobrazuyushkikh sul'fidov v gidrotermal' nykh usloviyakh' Moskva*, 27–102, 1968), found that the solubility of $Ag_2$ increases with pH in the range pH 4–8 in the temperature range 100°–300° C. Seward reported that for gold in solutions of reduced sulfur "a pronounced solubility maximum occurs in the region of pH about 7." (Seward, T. M., "Thio complexes of gold and the transport of gold in hydrothermal ore solutions," *Geochimica et cosmochimica Acta*, 7, 379–399, 1973).

Options for reducing hydrogen fugacity include bioprocessing hydrogen-management techniques. Hydrogen-consuming bacteria (hydrogenotrophs) include such anion-reducing bacteria as acetogens, methanogens, sulfate-reducing bacteria, and denitrifying (nitrate-reducing) bacteria. In natural ecosystems, these bacteria participate in "interspecies hydrogen transfer." Examples of acetogens include *Acetobacterium woodi* (ATCC 29683, DSM 1030, or DSM 2396) and *Clostridium aceticum* (ATCC 35044 or DSM 1496). Examples of hydrogen-consuming methanogens are numerous and include the mesophiles *Methanobrevibacter ruminantium* (ATCC 35063 or DSM 1093) and *Methanosarcina barkeri* (ATCC 29786 or DSM 805), and the thermophile *Methanobacterium thermoautotrophicum* (ATCC 29096 or DSM 1053). Examples of hydrogen-consuming sulfate-reducing bacteria are given in Table 3. As noted, some of the sulfate-reducing bacteria listed in Table 3 are also nitrate-reducing bacteria because they can also reduce nitrate to produce ammonium. In a preferred embodiment, leaching solution is produced in an anaerobic reactor by culturing in the reactor sulfate-reducing bacteria capable of using formate or acetate, as well as hydrogen as electron donors, and both sulfate and nitrate as electron acceptors. Since the anions sulfate and nitrate are reduced, such bacteria are oxyanion-reducing bacteria. Examples of such bacteria include mesophilic, fresh-water species such as *Desulfobacterium catecholicum* DSM 3882 (acetate and formate) and *Desulfovibrio simplex* DSM 4141 (formate); mesophilic, salt-water species, such as *Desulfovibrio salexigens* DSM 2638 (formate); and thermophilic, fresh-water species such as *Desulfomaculum kuznetsovii* DSM 6115 or VKM B-1805 (acetate and formate). Microorganisms with ATCC accession numbers can be obtained from the American Type Culture Collection, 12301 Parklawn Drive, Rockville, Ma. 20852-1776, tel 1-800-638-6597, fax 1-301-231-5826. Microorganisms with DSM accession numbers can be obtained from the Deutsche Sammlung von Mikroorganismen und Zellkulturen GmbH, Mascheroder Weg 1b, D-38124 Braunschweig, Germany, tel 011-49 (0)531-2616-336, fax 011-49 (0)531-2616-418. Microorganisms with VKM accession numbers can be obtained from the Institute of Biochemistry and Physiology of Microorganisms of the Russian Academy of Science, Pushchino-na-Oke, 142292 Moscow Region, Russian Federation.

TABLE 3

Examples of Hydrogen-Consuming Sulfate-Reducing Bacteria[a]

| Genus/species | Selected other electron donors (D) and acceptors (A) | Optimum pH range, units | Optimum temp., °C. | Growth requirements |
|---|---|---|---|---|
| Desulfobacter | | | | |
| genus | Acetate (D) | 6.0–7.0 | 20–33 | Vitamins[d] Salts[h] |
| curvatus (DSM 3379) | Acetate (D) | 6.8–7.2 | | |
| hyrogenophilus (DSM 3380) | | 6.6–7.0 | | |
| Desulfobacterium | | | | |
| genus | | 6.6–7.6 | 20–30 or 30–35 | |
| anilini (DSM 4660) | | | | |
| autotrophicum (DSM 3382) | Acetate (D), formate (D) | 6.7 | 25–28 | Vitamins°, salts[a] |
| catecholicum (DSM 3882) | Acetate (D), formate (D), Nitrate[c] (A) | 6.9–7.1 | 28 | Vitamins, dithionite |
| macestii (DSM 4194) | | | | |
| Desulfobulbus | | | | |
| genus | Propionate (D), ethanol (D), Nitrate[c] (A) | 6.6–7.5 | 25–40 | Vitamin[j], acetate as carbon |
| elongatus (DSM 2908) | | | | |

TABLE 3-continued

Examples of Hydrogen-Consuming Sulfate-Reducing Bacteria[a]

| Genus/species | Selected other electron donors (D) and acceptors (A) | Optimum pH range, units | Optimum temp., °C. | Growth requirements |
|---|---|---|---|---|
| propionicus (DSM 2032) | | | | |
| Desulfococcus | | | | |
| genus | | 6.6–7.6 | 28–35 | Salts[m] vitamins[n] |
| niacini (DSM 2650) | Formate (D), ethanol (D) | | | |
| Desulfomicrobium | | | | |
| genus | | 6.6–7.5 | 25–40 | Acetate as carbon |
| apsheronum (DSM 5918) | Ethanol (D) | | 25–30 | Reducing agents |
| baculatum | | | | |
| Desulfomonas | Ethanol (D) | 6.6–7.5 | 30–40 | Acetate as carbon |
| pigra (ATCC 29098) | | | | |
| Desulfomonile | Formate (D) | 6.8–7.0 | 37 | Vitamins, reducing agents[b] |
| tiedjei (ATCC 49306) | | | | |
| Desulfonema | Acetate (D) | 7.0–7.6 | 28–32 | Salts[j], sediment |
| limcola (DSM 2076) | | | | |
| Desulfosarcina | | 7.2–7.6 | 33 | Darkness |
| variabilis (DSM 2060) | | | | |
| Desulfotomaculum | | | | |
| genus | | 6.6–7.4 | | Vitamins? |
| geothermicum | | | 50–60 | Acetate as carbon? |
| kuznetsovii (DSM 6115) | Acetate (D), | ~7.0 | 60–65 | None |
| nigrificans (ATCC 19998) | | | 50–60 | |
| orientis (ATCC 19365) | | | 25–40 | |
| ruminis (ATCC 2393) | | | 25–40 | |
| thermoaceto-oxidans (DSM 5813) | Acetate (D), | 6.5 | 55–60 | Vitamins |
| Desulfovibrio | | | | |
| genus | Ethanol (D) | 6.6–7.5 | 25–40 34–37 | Biotin |
| africanus (DSM 2603) | | | | |
| carbinolicus (DSM 3852) | | | | |
| desulfuricans (ATCC 2774) | Nitrate (A), nitrite (A) | | 34–37 | Acetate as carbon |
| fructosovorans (ATTC 49200) | Formate (D) | ~7.0 | ~35 | Acetate as carbon |
| furfuralis | Nitrate (A) | ~6.8 | ~38 | |
| giganteus | Formate[f] (D) | 7.5 | 35 | Acetate as carbon; salt[g] |
| gigas (ATCC 19364) | Nitrite (A) | | 34–37 | |
| salexigens (ATCC 14822) | Formate (D), ethanol (D) | | 34–37 | Salt[k] |
| simplex (DSM 4141) | Formate (D), ethanol (D), Nitrate (A) | ~7 | ~37 | Acetate as carbon, $Ni^{+2}$, $WO_4^{-2}$ |
| sulfodisumtans (ATCC 43913) | | | | |
| termitidis (DSM 5308) | | | | |
| vulgaris (ATCC 29579) | | | 34–37 | Acetate as carbon |

TABLE 3-continued

Examples of Hydrogen-Consuming Sulfate-Reducing Bacteria[a]

| Genus/species | Selected other electron donors (D) and acceptors (A) | Optimum pH range, units | Optimum temp., °C. | Growth requirements |
|---|---|---|---|---|
| Thermodesulfo-bacterium | | 6.6–7.5 | | |
| commune (ATCC 33708) | | ~7.0 | 70 | Acetate as carbon |
| mobile (DSM 1276) | Formate (D) | | 70 | |

[a]Sources: Widdel and Pfennig, 1984; Holt et al., 1994.
[b]Vitamins are nicotinamide, 1-4-napthoquinone and thiamine in a defined mineral medium. Reductants are 1 mM $Na_2S.9H_2O$ or 0.5 mM $Na_2S_2O_4$.
[c]Denitrified to ammonium.
[d]Vitamins are biotin and p-aminobenzoate.
[e]Salts are 20 g/l NaCl and 3 g/l $MgCl_2.6H_2O$.
[f]Completely oxidized.
[g]Salt is 2 to 25 g/l NaCl.
[h]Salts are >7 g/l NaCl and >1 g/l $MgCl_2.6H_2O$.
[i]Vitamin is p-aminobenzoic acid.
[j]Salts are >15 g/l NaCl and >2 g/l $MgCl_2.6H_2O$.
[k]Salt is 20 g/l NaCl.
[m]Salts are 7–20 g/l NaCl and 1–3 g/l $MgCl_2.6H_2O$.
[n]Vitamins are thiamine, biotin and p-aminobenzoic acid.
[o]Vitamins are biotin, p-aminobenzoate and nicotinate.

In an alternative embodiment, preferred for laboratory studies, additional hydrogen consumption is accomplished by purging the headspace of bisulfide leaching reactor 22 through a $H_2S$-scrubbing means (e.g., a zinc acetate solution "bubbler") into a nitrate-fed reactor containing a culture of sulfate-reducing bacteria that are also capable of nitrate reduction, operated in parallel (side-stream) or in series with reactor 22. In this way, "hydrogen-scrubbed" headspace gas is recycled back to reactor 22. Alternatively, a zinc acetate bubbler would not be required if the $H_2S$ concentration in reactor 22 were controlled independently by a side-stream bubbler controlled by a sulfide ion-selective electrode that would turn on a $H_2S$-scrubbing bubbler loop when a high $H_2S$ setpoint was reached.

In an alternative embodiment, the $H_2S$ fugacity and the $HS^-$ concentration may be increased to an appropriate level, and the $H_2$ fugacity may be reduced to an appropriate level in the environment provided by reactor 22 by contacting the contents of reactor 22 with a stream of gas having an appropriate $H_2S$ fugacity and effectively no $H_2$. This stream of gas may be produced biologically by a culture comprising sulfate-reducing bacteria or it may be produced abiotically. An equilibrium will be reached that partitions the constituents of reactor 22 of limited solubility between the gas and liquid phases in reactor 22. Henry's Law can be used to predict equilibrium constituent levels.

While gold, silver, and platinum-group elements are soluble in bisulfide solutions at atmospheric pressure and at room temperature, their solubilities generally increase with pressure and temperature (Krauskopf, K. B., *Economic Geology*, 46, 858–870, 1951; Weissberg, B. C., *Economic Geology*, 65, 551–556, 1970). For this reason, in an alternative embodiment, sulfate-reduction reactor 8 is operated in the thermophilic (50°–100° C.) and barophilic (over one atmosphere) ranges (in a submerged, covered heap).

Precious metals recovery options include adsorption on activated carbon, adsorption on ion-exchange resin, and modification of the solution pH, hydrogen fugacity, or oxidation-reduction potential (ORP). In an alternative embodiment, precious metals are adsorbed on the cell walls of bacteria and the bacteria are separated from the liquid in which they are suspended by settling and/or filtration of the liquid after settling of the ore particles. Options that do not otherwise modify lixiviant solution chemistry are preferable. For this reason, in preferred embodiments, at least reactors 8 and 22, and preferably also reactor 26, are operated together as a single, essentially completely-mixed reactor.

Recovered precious metals are converted into products. This may include the operations of separating, smelting, and casting of each precious metal into bars or bullion.

Figure 2:
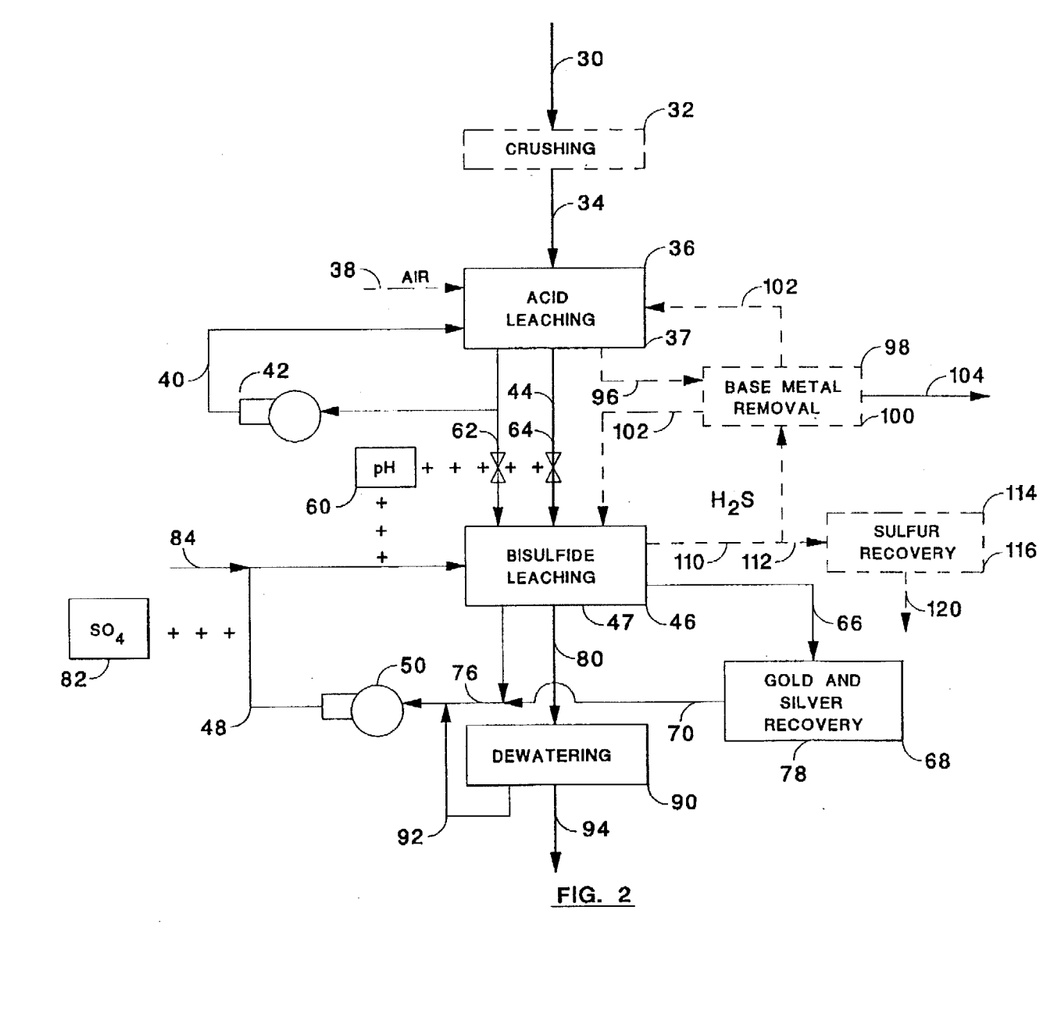
FIG. 2 is a highly schematic block diagram illustrating a second representative embodiment of the present invention.

Reference is now made to FIG. 2 which is a schematic diagram illustrating a second alternative representative embodiment of the invention, with dashed lines representing possible variations in the process and apparatus. In this embodiment, ore 30 preferably undergoes crushing 32 to facilitate exposure of precious metal values in the ore to processing solutions. Crushed ore 34 then undergoes acid leaching 36 in aerobic reactor 37. If necessary, air 38 is added in the acid leaching step. Acid-leach solution 40 is recirculated through the ore undergoing acid leaching by means of pump 42.

Acid-leached ore 44 then undergoes bisulfide leaching 46 in essentially completely-mixed, anaerobic reactor 47. Bisulfide lixiviant 48 is recirculated through the ore undergoing bisulfide leaching by means of pump 50. The pH of bisulfide lixiviant 48 is established at an optimum pH by pH controller 60 which controls the rate of addition of acid-leached ore 44 and acid-leach solution 40 to reactor 47 by means of valves 62 and 64. The sulfate and/or the sulfide concentration in bisulfide lixiviant recirculation loop 76 is monitored by sensor/controller 82, which may comprise an ion-specific electrode. Sensor/controller 82 is programmed to add up to a stoichiometric amount of electron donor 84, which is a sulfate-reducing bacteria growth substrate such as formate, acetate or methanol, to bisulfide lixiviant recirculation loop 76.

Pregnant bisulfide lixiviant 66, which contains precious metal values is subjected to gold and silver recovery 68. Recovered gold and silver is converted into products (e.g., bars of essentially pure metal). Spent lixiviant 70 is returned to bisulfide lixiviant recirculation loop 76. In a preferred embodiment, gold and silver recovery 68 is accomplished by passing pregnant bisulfide lixiviant 66 through activated carbon column 78.

Leached ore 80 undergoes dewatering 90 by conventional means, such as settling and/or vacuum filtration. Contained bisulfide lixiviant 92 is returned to bisulfide lixiviant recirculation loop 76. Waste ore 94 is disposed of by using conventional means.

In an alternative embodiment, acid-leach solution portion 96 undergoes base metal removal 98 in base metal removal reactor 100. Excess hydrogen sulfide gas 110 removed from anaerobic reactor 47 is introduced to base metal removal reactor 100 to precipitate iron and other base metals 104. Acid-leach solution portion 102 having a reduced base metal content may be returned to reactor 37, or optionally, to reactor 47.

In an alternative embodiment, excess hydrogen sulfide gas portion 112 undergoes sulfur recovery 114 in sulfur recovery reactor 116. Recovery of element sulfur 120 may be accomplished by the conventional Claus process or by means of the process disclosed in U.S. Pat. No. 4,666,852, which disclosure is incorporated herein as if fully set forth.

Figure 3:
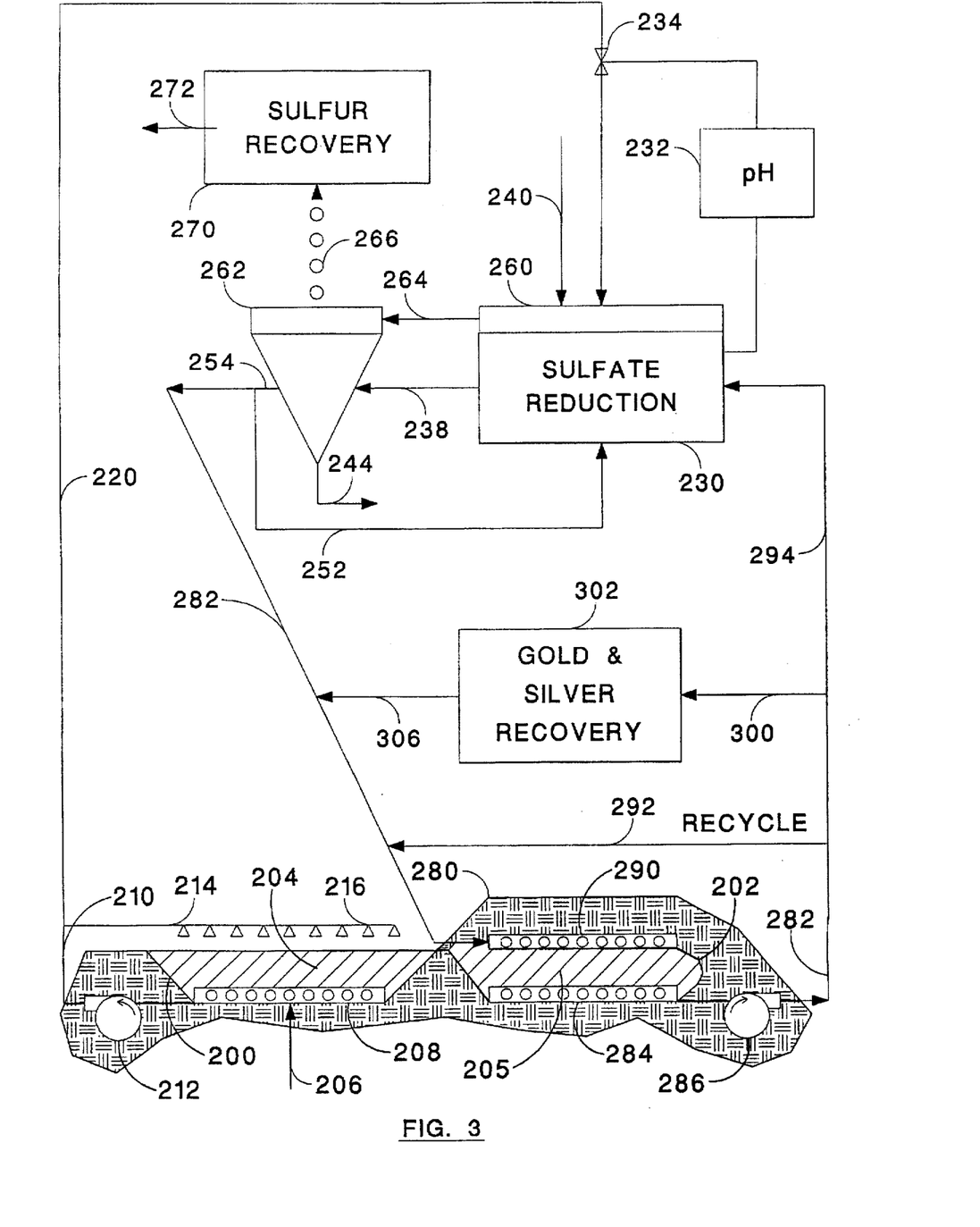
FIG. 3 is a highly schematic block diagram illustrating a third representative embodiment of the present invention.

Reference is now made to FIG. 3 which is a schematic diagram illustrating a third alternative representative embodiment of the invention, with dashed lines representing possible variations in the process and apparatus. In this embodiment, sequential processing of heaps 200 and 202 of crushed ore 204 and 205 is accomplished. In heap 200, conventional bio-oxidation of crushed ore particles 200 is accomplished to free precious metals dispersed or occluded within the ore. Air 206 may be introduced to heap 200 via plenum 208. Acidic, base-metal sulfate leach solution 210 is collected from the bottom of heap 200 through plenum 208 by means of pump 212. Portion 214 of leach solution is recirculated by means of pump 212 and distributor 216 to the top of heap 200.

As was noted above, bio-oxidation of heap 200 may include ore crushing, acid pretreatment, inoculation with appropriate sulfide-oxidizing bacteria, addition of nutrients, recirculating the biolixiviant and cooling the heap (for 3 to 8 days), and allowing the heap to "rest" (for 3 to 8 days). Additional process steps may include washing heap 200 for an extended period (e.g., 14 days) to remove residual acidity or iron content, and breaking heap 200 apart in order to agglomerate ore 202 with cement and/or lime to make a new heap, such as heap 202.

Portion 220 of acidic, base-metal sulfate leach solution 210 produced by the bio-oxidation step is introduced to anaerobic, sulfate-reduction reactor 230. In this embodiment of the process, reactor 230 is a side-stream reactor. The rate of addition of portion 220 to reactor 230 may be controlled by pH controller 232 which operates valve 234 to create an optimum pH for precious metals leaching in bisulfide leach solution 238 produced by reactor 230. Preferably, non-toxic electron donor 240 (such as formate, acetic acid (e.g., vinegar), acetate, or methanol—which does not bind effectively to activated carbon), is added to anaerobic reactor 230 to enrich within reactor 230 a microbial culture comprising sulfate-reducing bacteria. Anaerobic reactor 230 is preferably operated in a pH-stat mode by adding a sufficient portion 220 of acidic sulfate solution to maintain a neutral pH in reactor 230. The concentration of dissolved sulfide ($H_2S$, $HS^-$ and $S^{-2}$) in the anaerobic reactor is maintained below about 2,500 mg/l to prevent inhibition of the microbial culture comprising sulfate-reducing bacteria.

In a preferred embodiment, base metals 244 (such as iron) are precipitated in downstream settling tank 250, and portion 252 of clarified bisulfide lixiviant 254 is recirculated to reactor 230. The rate of recirculation of portion 252 is preferably chosen so that reactor 230 and settling tank 250 are operated together as a single, essentially completely-mixed reactor. Headspace 260 of reactor 230 and headspace 262 of settling tank 250 are preferably connected by conduit 264. Excess hydrogen sulfide gas ($H_2S$) 266 produced in anaerobic reactor 230 (e.g., that amount over about 2,700 mg/l) and tank 250 is preferably removed. In some embodiments, excess hydrogen sulfide gas undergoes sulfur recovery 270 to produce elemental sulfur 272. By means of reactor 230 and tank 250, sulfate-reducing bacteria are used to create clarified, approximately neutral (pH 6 to 9) leaching solution 254 comprising bisulfide ions and a low concentration of dissolved and suspended base metals. Bisulfide lixiviant 254 and headspace 260 comprise the reactor environment of reactor 230.

In a preferred embodiment, heap 200 is undergoing bio-oxidation while a second heap 202, which has previously undergone bio-oxidation, undergoes leaching with bisulfide lixiviant. In a second process step, oxidized ore 205 is preferably covered with cover 208 and submerged in bisulfide lixiviant 282 to exclude oxygen. Heap 202 is leached by recirculating portion 292 of neutral bisulfide lixiviant 282 saturated with $H_2S$ through it by means of plenum 284, pump 286, and distributor 290. In an alternative embodiment, the $H_2S$ partial pressure is increased by introducing the lixiviant under pressure at the bottom of a heap via plenum 284 which is submerged in lixiviant 282, causing $HS^-$ ion concentrations to increase in direct proportion to the increase in $H_2S$ partial pressure. This may increase the concentration of dissolved sulfide ($H_2S$, $HS^-_{4-x}$ and $S^{-2}$) in heap 202 above 2,500 mg/l. In a preferred embodiment, anaerobic reactor 230, settling tank 250, and heap 202 are operated together as a single, essentially completely-mixed reactor by recirculating portion 294, from heap 202, to reactor 230.

Complexed gold and silver in pregnant portion 300 of lixiviant 282 is recovered continuously from the lixiviant solution in reactor 302. Recovery may be accomplished in a conventional manner by adsorption on activated carbon or by precipitation on zinc dust or by modifying either the solution pH, hydrogen fugacity, or oxidation-reduction potential (ORP). Metal that has been recovered from activated carbon eluent by electrowinning or zinc dust may be smelted to recover precious metal values as products. Barren lixiviant solution 306 is recycled to heap 202.

Many variations in configurations have been discussed and others will occur to those skilled in the art. Some variations within the scope of the claims include biotic and abiotic means for producing the bisulfide lixiviant. All such variations within the scope of the claims are intended to be within the scope and spirit of the present invention.

We claim:

1. A method for extracting a precious metal from an ore comprising the steps of producing a leaching solution, said solution comprising dissolved hydrogen sulfide gas and bisulfide ions, and having a fugacity of hydrogen gas;

reducing the fugacity of hydrogen gas in said leaching solution by means of an oxyanion-reducing bacterium;

exposing said ore to said leaching solution; and recovering said precious metal from said leaching solution.

2. The method of claim 1 wherein the producing step is carried out by means of a sulfate-reducing bacterium.

3. The method of claim 1 wherein the oxyanion-reducing bacterium is selected from the group consisting of:

an acetogen, a methanogen, a sulfate-reducing bacterium, and a nitrate-reducing bacterium.

4. The method of claim 1 wherein the oxyanion-reducing bacterium is selected from the group consisting of:

*Desulfobacterium catecholicum* (DSM 3882),

*Desulfovibrio simplex* (DSM 4141),

*Desulfovibrio salexigens* (DSM 2638), and

*Desulfomaculum kuznetsovii* (DSM 6115 or VKM B-1805).

5. A process for precious metal leaching comprising the steps of biologically reducing a dissolved sulfate under anaerobic conditions to produce a bisulfide lixiviant having an approximately neutral pH and a hydrogen gas fugacity of less than 0.001 atmospheres, leaching a first portion of an ore comprising at least one precious metal by exposing said ore to said bisulfide lixiviant, and recovering said at least one precious metal from said bisulfide lixiviant.

6. The process of claim 5 further comprising biologically oxidizing said first portion of an ore prior to said leaching step.

7. The process of claim 5 wherein said dissolved sulfate is produced by biologically oxidizing a second portion of an ore.

8. The process of claim 5 wherein said biologically reducing step and said leaching step are accomplished in an essentially completely mixed reactor and at a pH in the range of 6 to 8 units.

9. The process of claim 7 wherein said biologically oxidizing step occurs in a first heap of ore and said leaching step occurs in a second heap of ore.

10. The process of claim 9 wherein said recovering step is comprised of exposing pregnant bisulfide solution to activated carbon and eluting said precious metals from said activated carbon.

11. An apparatus for extracting a precious metal from an ore comprising:

means for producing a leaching solution, said solution comprising dissolved hydrogen sulfide gas and bisulfide ions, and having a fugacity of hydrogen gas and for reducing the fugacity of hydrogen gas in said leaching solution;

means for exposing said ore to said leaching solution; and means for recovering said precious metal from said leaching solution.

12. A process of making a product, said product comprising a precious metal that can form a complex comprising bisulfide, said complex having an aqueous solubility, said process comprising the steps of:

introducing an ore of said precious metal into an anaerobic reactor environment, said reactor environment having an activity of dissolved hydrogen sulfide gas, an activity of dissolved bisulfide ions, and a fugacity of hydrogen gas;

increasing said activity of dissolved hydrogen sulfide gas and said activity of dissolved bisulfide ions and reducing said fugacity of hydrogen gas, whereby the solubility of the precious metal-bisulfide complex is increased;

removing the precious metal-bisulfide complex from said reactor environment;

separating said precious metal from said metal-bisulfide complex; and forming said product from said precious metal;

wherein said increasing step and said reducing step are accomplished by at least one step selected from the group consisting of contacting said reactor environment with a culture of an oxyanion-reducing bacterium, and contacting said reactor environment with a stream of gas comprising hydrogen sulfide gas and a fugacity of hydrogen gas of less that 0.001 atmospheres.

13. The process of claim 12 wherein said precious metal is selected from the group consisting of gold, silver, and platinum.

14. The process of claim 12 wherein said increasing step is accomplished by contacting said reactor environment with a culture of a sulfate-reducing bacterium.

* * * * *